April 12, 1966  F. G. ZAGAR  3,245,099
ROOT DIAMETER REAMER TAP
Filed Dec. 26, 1963

INVENTOR.
FRANK G. ZAGAR
BY Ely, Pearne, & Gordon
attorneys

United States Patent Office 3,245,099
Patented Apr. 12, 1966

3,245,099
ROOT DIAMETER REAMER TAP
Frank G. Zagar, Cleveland, Ohio, assignor to Zagar, Inc., Cleveland, Ohio, a corporation of Ohio
Filed Dec. 26, 1963, Ser. No. 333,530
2 Claims. (Cl. 10—140)

This invention relates to tools which are used to both ream and then tap a hole in a single feed stroke. These tools are referred to as reamer taps. They are fed through holes to be tapped at a coarse rate of feed corresponding to the pitch of the tapped thread.

Both reaming and tapping may be necessary where the tapped hole is to be used in an application requiring fluid-tight threaded engagement, or in other applications requiring burr-free threads. Another case where both reaming and tapping is sometimes necessary is where hole sizes are not uniform as for example with cold-forged nut blanks where the hole is formed by a punch which wears rapidly so that hole size is difficult to maintain accurately.

In many applications requiring both reaming and tapping, the accomplishment of these two functions with different tools and successive strokes is economically unfeasible. Reamer taps have therefore been employed, but these tools have been themselves quite costly as compared to conventional taps. The added cost of reamer taps as compared to conventional taps has resulted from the relatively complicated and elaborate shape of the reamer tap tool.

An object of the present invention is to provide reamer taps which in important aspects of their operation are as good or better than known reamer taps but which can be manufactured at little or no more cost than ordinary (non-reaming) taps.

By way of example, the invention is illustrated in the following description and the accompanying drawings.

Figure 1:
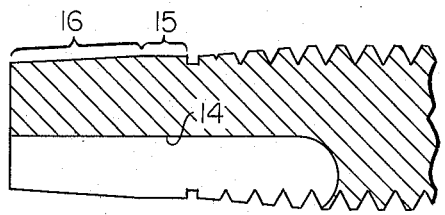
FIGURE 1 is a sectional illustration of the tip of a reamer tap of the prior art.

The FIGURE 1 illustration of a known or conventional reamer tap is included so that the improvements of the present invention may be more readily understood. The tool shown in FIGURE 1 is fluted as at 14. Usually additional flutes are provided. The tapered or conical (frustoconical) portion 16 of the tool comprises a reamer which, due to its taper, enlarges an initially small hole by taking stock out of the hole as the tool is advanced in the feed direction. This reaming operation occurs prior to the tapping operation, but both operations occur during a single stroke of the tool.

The cylindrical portion 15 of the tool comprises a guide or lateral bearing surface which turns in sliding and supported relationship within the reamed hole and furnishes a large bearing area for supporting the tool against lateral deflections. It is to be noted that when the hole that is to be tapped extends completely through the workpiece, as in the case of tapped nuts and in most other applications, the guide portion 15 passes out of the end of the tapped hole prior to completion of the tapping operation.

Figure 2:
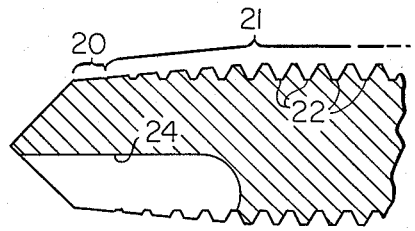
FIGURES 2, 3 and 4 are sectional illustrations of the tips of reamer taps embodying the invention.
Figure 3:
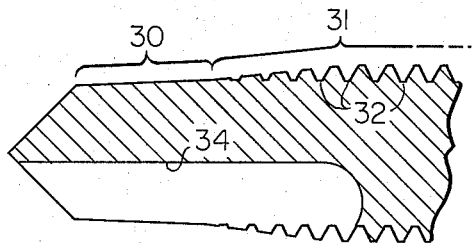
Figure 4:
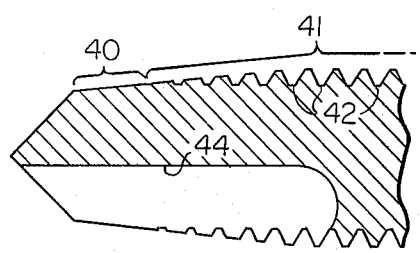
Figure 5:
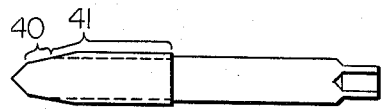
FIGURE 5 is an over-all schematic elevational view of the tool shown in FIGURE 4.

The invention is illustrated in FIGURES 2, 3 and 4, which show tools fluted respectively as at 24, 34 and 44. Each of the illustrated tools may be provided with more than one flute.

In each of the illustrated embodiments, there is provided a conical non-tapping reaming portion. This is the portion 20 in FIGURE 2, 30 in FIGURE 3, and 40 in FIGURE 4. The intersections of the conical surfaces 20, 30 and 40 with the flutes 24, 34 and 44 provide the cutting edges for reaming. In each of the illustrated embodiments there is provided a tapping portion. In FIGURE 2 this is the portion 21, in FIGURE 3 the portion 31, and in FIGURE 4 the portion 41.

In each of the embodiments of FIGURES 2, 3 and 4, the tapping portion extends backwardly and progressively radially outwardly from the major diameter of the reaming portion until the major diameter of the working part of the tool is reached. Beyond this point the tapping portion has a constant outside diameter. In each embodiment the tapping portion is formed with teeth having roots which are flat in longitudinal cross-section and which therefore move in the surface of an imaginary cylinder, and in each case the root diameter of the tapping portion (i.e., the diameter of the imaginary cylinder) is equal to the major diameter of the conical non-tapping portion of the tool. Thus in FIGURE 2 the tapping portion 21 is formed with teeth having roots 22 which are flat in longitudinal cross-section and which therefore move in the surface of an imaginary cylinder. The diameter of this imaginary cylinder is equal to the major diameter of the conical non-tapping portion 20. Similarly in FIGURE 3 the tapping portion of the illustrated tool is formed with teeth having roots 32 which are flat in longitudinal cross-section and which therefore move in the surface of an imaginary cylinder. The diameter of this cylinder is equal to the major diameter of the conical non-tapping portion 30. In FIGURE 4 the tapping portion of the illustrated tool is formed with teeth having roots 42 which are flat in longitudinal cross-section and which therefore move in the surface of an imaginary cylinder. The diameter of such cylinder is equal to the major diameter of the conical non-tapping portion 40.

The tools shown in FIGURES 2, 3 and 4 are used to ream and then tap a hole in a single operation. It will be seen that the portions 20, 30 and 40 in FIGURES 2, 3 and 4 accomplish what is accomplished by the reamer portion 16 in FIGURE 1. The flat root portions 22, 32, and 42 in FIGURES 2, 3, and 4 accomplish a tool-guiding action and furnish a large bearing surface for laterally supporting the tool within the reamed hole. They distribute, so to speak, the lateral bearing area along the length of the tapping portion of the tool, rather than restricting the lateral bearing area to the feeding end of the tool at a location in advance of the tapping portion of the tool. It is to be noted that guiding engagement with the sides of the reamed hole therefore continues even when the leading reaming end of the tool has passed completely out of the hole and the workpiece continues to be contacted solely by the tapping portion of the tool.

The tapping portion of a conventional reamer tap such as that shown in FIGURE 1 is formed by using a grinding wheel. The tapping portions of the tools shown in FIGURES 2, 3 and 4 may be made in the same way, the flat roots 22, 32, and 42 being formed by employing a grinding wheel having a grinding edge that is centrally flattened.

The conical cutting portion 20 is defined by the same conical surface of revolution as contains the tips of the teeth in the leading end of the tapping section of the embodiment shown in FIGURE 2. The sides of this cone are at an angle of about 9 degrees with the central longitudinal axis of the tool. This tool has relatively high end loading because the end loading increases in proportion to the angle between the reamer portion and the tool axis.

In the tool of FIGURE 3 the end loading is substantially decreased because the portion 30 is contained within a cone having an angle of only 2 degrees with the axis of the tool. The tips of the teeth in the leading end of the tapping portion 31 are contained within another imaginary cone having an angle of 9 degrees with the longitudinal axis of the tool. The tool of FIGURE 3 has an end loading which is as small as that of the conventional tool of FIGURE 1. However the tool of FIGURE 3 costs more to manufacture than the tool of FIGURE 2 because of the difference in the angles formed between the longitudinal tool axis and each of the portions 30 and 31.

The tool shown in FIGURE 4 represents a compromise between the tool of FIGURE 2 and the tool of FIGURE 3. The reamer portion 40 and the tips of the teeth of the leading end of the tapping portion 41 are contained within the same imaginary conical surface of revolution so that each of these portions has the same angle with the longitudinal tool axis, and in this respect the tool of FIGURE 4 is like the tool of FIGURE 2. However such cone in FIGURE 4 has an angle of only 7 degrees with the longitudinal axis of the tool. This makes the end loading of the tool of FIGURE 4 substantially lower than that of FIGURE 2 although not quite so low as the end loading of the tool of FIGURE 3. The manufacturing cost of the tool of FIGURE 4 is about as low as the manufacturing cost of the tool of FIGURE 2, and the manufacturing cost of the latter is little or no more than the cost of manufacturing ordinary (non-reaming) taps—substantially less than the manufacturing cost of conventional reaming taps such as the tool shown in FIGURE 1.

The cost of manufacture of the tool of FIGURE 3 is somewhat higher than the cost of the tools of FIGURES 2 and 4 due to the difference in the angles formed between the longitudinal tool axis and each of the portions 30 and 31.

As used herein the term "conical" means and includes frusto-conical.

The invention is not necessarily restricted to the slavish imitation of each and every one of the details and relationships described above which have been set forth merely by way of example with the intent of most clearly conveying the teaching of the invention to the reader. Obviously devices may be provided which change, eliminate or add certain structural details or relationships without departing from the invention.

What is claimed is:

1. A reamer tap having a fluted conical non-tapping reaming portion extending backwardly from its tip, an at least partially fluted tapping portion extending backwardly and progressively radially outwardly from said conical reaming portion until the major diameter of the working part of the tool is reached and thence extending backwardly at a constant outside diameter, said tapping portion being formed with teeth having roots which are flat in longitudinal cross-section and which therefore move in the surface of an imaginary cylinder, the root diameter of said tapping portion being equal to the major diameter of the conical non-tapping portion.

2. A device as in claim 1 in which the tips of the teeth in the leading end of the tapping portion are contained within an imaginary cone which represents an extension of the cone defining said conical non-tapping portion.

References Cited by the Examiner
UNITED STATES PATENTS

| | | | |
|---|---|---|---|
| 1,434,870 | 11/1922 | Brubaker | 10—140 |
| 1,817,133 | 8/1931 | Duchesne | 10—141 |
| 1,982,737 | 12/1934 | Judge | 10—141 |
| 2,029,514 | 2/1936 | Thomson | 10—141 |

WILLIAM W. DYER, Jr., *Primary Examiner.*

F. YOST, *Assistant Examiner.*